Oct. 2, 1928.
K. C. BENN
1,685,900
SECTIONAL AIR BAG
Filed Feb. 2, 1926
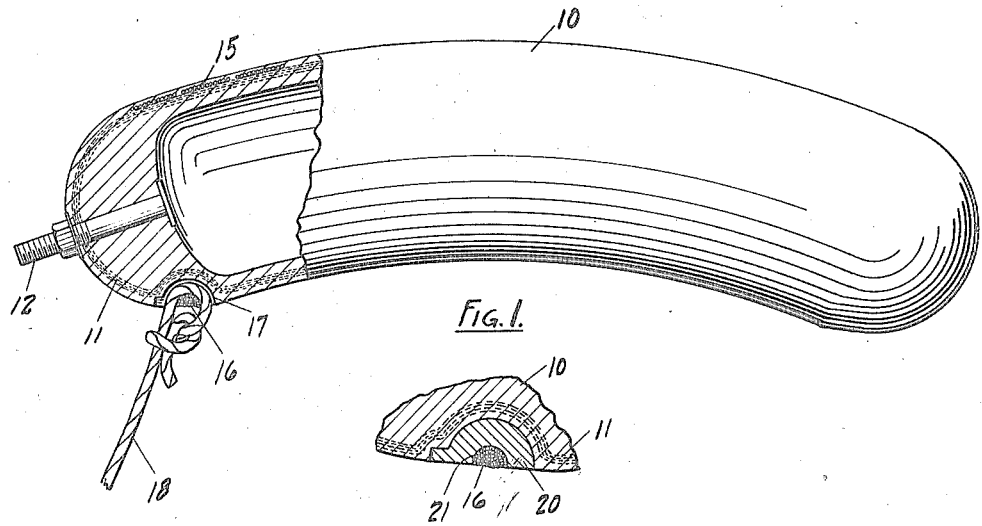
Fig. 1.
Fig. 3.
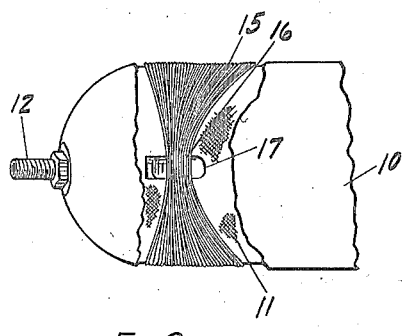
Fig. 2.
INVENTOR.
KIT CURTIS BENN.
BY
ATTORNEY.

Patented Oct. 2, 1928.

1,685,900

UNITED STATES PATENT OFFICE.

KIT CURTIS BENN, OF AKRON, OHIO, ASSIGNOR TO THE MOHAWK RUBBER COMPANY, OF AKRON, OHIO, A CORPORATION OF OHIO.

SECTIONAL AIR BAG.

Application filed February 2, 1926. Serial No. 85,491.

This invention relates to sectional air bags, such as used in the repair of penumatic automobile tires, and particularly to an improved construction by which the bag may be removed from the interior of the tire casing after the repair operation is completed.

In the repair of pneumatic tires, the rubber forming the body of the bag becomes soft under heat and often sticks to the interior of the casing. Heretofore, in the construction of these bags a hook or plate has been attached to the end of the bag at the point where the valve stem is located, and when pull is exerted upon the soft, hot bag at this point, the end of the bag is apt to and often does pull out, destroying the bag.

The object of the present invention is to improve upon the construction and design of these sectional air bags so as to secure a firm, anchoring means for a tool or cord by which the bag can be pulled out of the tire casing, in which there is no possibility of the bag being ruptured or destroyed by the pull exerted to remove it from the casing.

In the drawings is illustrated one embodiment of the invention, it being understood that, having explained and described the invention, those skilled in the art may modify and change the specific construction without departing from the essential features thereof as set forth in the claims.

In the drawings:

Figure 1 is a side view of a sectional air bag of the usual type, except as modified by the present invention, the end of the bag embodying the pulling device being shown in section;

Figure 2 is a view of the end of the bag looking at the under side thereof, the outer rubber covering being removed to show the internal construction; and Figure 3 is a detail showing the method of making the bag.

The bag is composed of the usual rubber casing 10 which may be provided with layers of reinforcing fabric 11. One end of the bag carries the valve stem 12 by which the bag is inflated.

At one end the bag is formed with the device of the present invention which affords an easy means of withdrawing the bag from the tire casing. A strip of fabric 15, preferably gum-coated cord fabric, is wound several times about the end of the bag and over the carcass of reinforcing fabric 11. These strips of fabric are bunched together into a cable 16 at the inner circumference of the bag, and at this point are unattached to the bag to form a loop or eye 17. The fabric or cords are vulcanized within and around the bag at every other point.

In the operation of the bag a cord, illustrated at 18, a hook or other implement is inserted through the eye by which the bag can be removed. It will be observed that a very firm anchorage is afforded for the device by which the bag may be removed. The fabric embedded within the rubber wall and about the circumference of the bag cannot be pulled out by any force which is required to remove the bag from the tire.

An easy method of forming the cable and eye is by the embedding of a small metal filler piece or blank 20 within the wall of the bag during the process of building and before curing, the face of the blank being formed with a groove 21 to seat the cable. The blank is removed from the bag after it is cured.

What is claimed is:

1. In a sectional air bag construction, an expansible bag having a recess formed upon its inner face, and a band of cord fabric wrapped about the bag a plurality of times, the cords being brought together to form a cable which passes over the recess and forms an eye.

2. A sectional air bag construction, comprising an expansible bag, and a layer of fabric wrapped transversely of the bag and vulcanized therein except at one point where it is detached from the bag to form an anchorage for bag removing means.

3. A sectional air bag construction, comprising an expansible bag, and a layer of cord fabric wrapped transversely around the bag a plurality of times, the cord fabric being embedded within the bag and vulcanized thereto except at a point on its inner surface where the cords are bunched together and are separated from the body of the bag to form an eye by which the bag may be removed from the tire.

KIT C. BENN.